Dec. 6, 1949  A. BRABAZON  2,490,616
PASTRY ROLLER DEVICE
Filed Dec. 2, 1946  2 Sheets-Sheet 1
FIG. I.
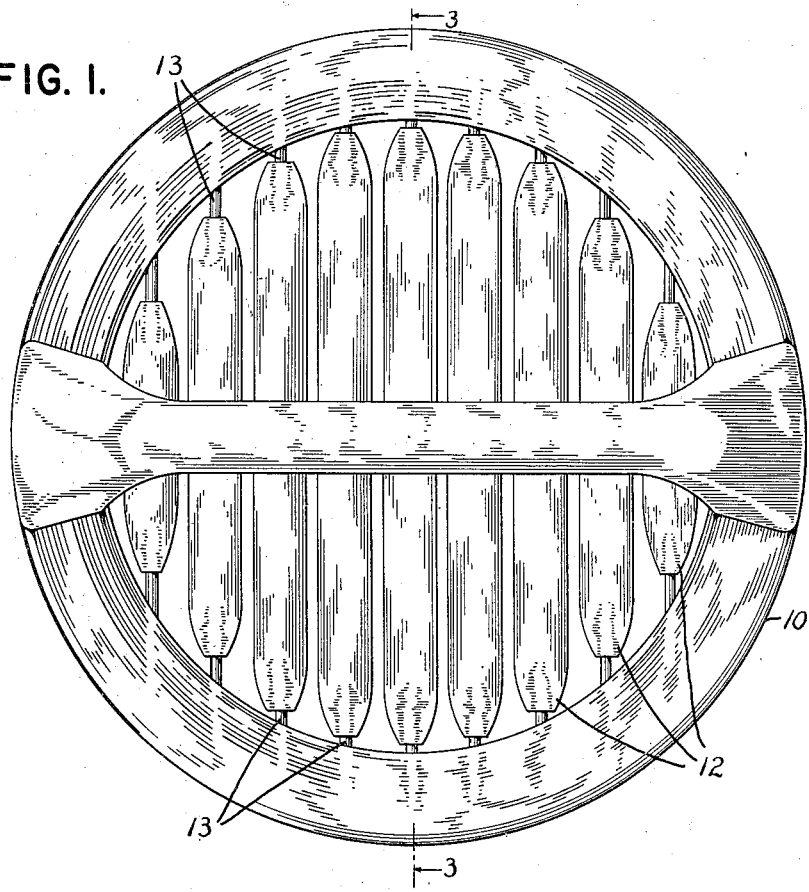
FIG. 2.
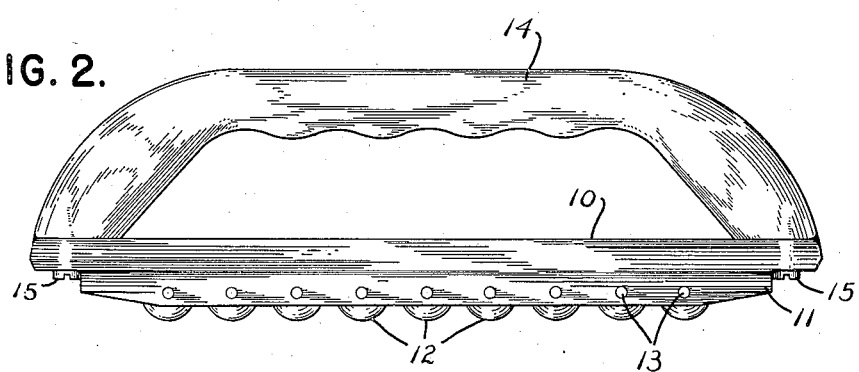
FIG. 2a.
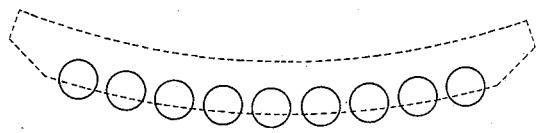
*INVENTOR.*
ALBERT BRABAZON
BY
ATTORNEY Dec. 6, 1949 A. BRABAZON 2,490,616
PASTRY ROLLER DEVICE
Filed Dec. 2, 1946 2 Sheets-Sheet 2

INVENTOR.
ALBERT BRABAZON
BY John J. Rogan
ATTORNEY

Patented Dec. 6, 1949

2,490,616

UNITED STATES PATENT OFFICE 2,490,616

PASTRY ROLLER DEVICE

Albert Brabazon, Flushing, N. Y.

Application December 2, 1946, Serial No. 713,495

7 Claims. (Cl. 107—50)

This invention relates to the art of pastry making, and more particularly it refers to improvements in pastry rollers.

One of the greatest difficulties in the pastry-making art, especially in the making of pastries for pies and the like, is in gauging the proper amount of pressure and rolling to which the pastry dough should be subjected. Heretofore it has been the customary practice to employ a single comparatively heavy roller of relatively large diameter to effect the necessary rolling and pressing of the pastry dough. However such large diameter rollers do not give the desired uniformity of working of the pastry dough, except in the hands of highly skilled personnel. Furthermore, with these conventional single-roll devices, great care must be exercised to insure that during the rolling of the dough, the latter does not adhere to the roller surface. This has usually required the covering of the roller with a layer of dry flour which must be repeated during successive rollings. Particularly in the art of pie making, the direction of rolling and the pressure are of critical importance, and the repeated flouring of the usual roller by inexperienced personnel may prevent attaining the desired uniformity of the pastry product. Furthermore, it is well recognized in the pastry making art that the pastry dough should be rolled out in more than one direction. With the usual heavy single roller of large diameter this is not always achieved.

Accordingly, it is one of the principal objects of this invention to provide a pastry roller device which, even in the hands of inexperienced personnel can be used to produce uniformly rolled pastry dough, especially that to be used in making pies and the like.

Another object of the invention is to provide an improved pastry roller which overcomes all the above-noted disadvantages of the usual single large-diameter pastry roller or rolling pin.

A further object is to provide a pastry roller which is light in weight and which can be manipulated easily in any rolling direction, with one hand.

A still further object is to provide a pastry roller wherein the likelihood of the rolled dough adhering to the roller is greatly reduced.

A feature of the invention is a pastry rolling device employing a plurality of rotatable small diameter rollers which are rotatably mounted in a common surrounding frame.

Another feature relates to a pastry rolling device having a series of relatively small diameter rollers rotatably mounted in a frame, the rollers being of a specially chosen plastic which has the property of reducing the likelihood of the pastry dough adhering thereto during the rolling and pressing operations.

A further feature relates to the novel organization, arrangement and relative location of parts which cooperate to provide an improved pastry roller device.

Other features and advantages not particularly enumerated will be apparent after a consideration of the following detailed descriptions and the appended claims.

In the drawings,

Fig. 1 is a top plan view of a device embodying features of the invention.

Fig. 2 is a front elevation of Fig. 1.

Fig. 2a is a schematic illustration of a modification of Figs. 1 to 3.

Figure 3:
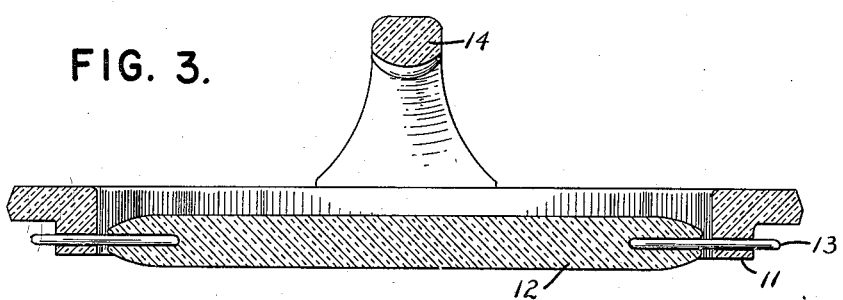
Fig. 3 is a sectional view of Fig. 1 taken along the line 3—3 thereof.

Referring to the embodiment of Figs. 1 to 3, the device comprises a circular frame 10 having a downwardly extending rim or lip 11 in which are rotatably mounted a series of relatively small diameter and parallel rollers 12. While the drawing shows a device with nine such rollers, a greater or less number may be employed. However I have found that by employing a multiplicity of such rollers, and by spacing the adjacent rollers a short distance as compared with their diameter, it is possible to achieve the best results in the finished rolled pastry. As shown more clearly in Fig. 3, each roller has its ends smoothly tapered, and tightly fitted into each of these ends is a metal pin 13, preferably, although not necessarily, of stainless steel. These pins pass through corresponding openings in the lip 11 which latter openings are sufficiently large to allow the pins and their attached rollers freely to rotate. The rollers are preferably mounted so that their lower peripheries are all located in the same flat plane as shown in Fig. 2.

In the preferred form of the device, the rollers 12 are all of the same diameter, but are of different lengths, as shown in Fig. 1. If desired however, the rollers may be mounted in the frame so that their lower peripheries are located on a circular arc as schematically illustrated in Fig. 2a. A suitable inverted U-shaped handle 14 is fastened, for example by screws 15, to the upper face of frame 10. It will be understood however that the handle 14 can be fastened to the frame 10 in any other manner, for example by cementing, or if desired the handle 14 and the frame 10 may be molded as one piece.

I have found that if the individual rollers 12 are made of "Lucite" a methyl methacrylate plastic product, the best results are obtained. While I am not prepared to state the reason for these results, it is probably due to the fact that such a plastic is non-porous and has a very low adherence coefficient with relation to the usual pastry doughs employed in pie making and the like. Furthermore, since the rollers are preferably of relatively small diameter, for example one inch or less, and since they are closely spaced, for example by 1/8 inch, if there is any tendency for the leading roller as it contacts with the dough to carry the latter with it, the succeeding roller acts somewhat in the nature of a stripper roller and prevents the layer of dough from being carried entirely around by the rollers. In any event, I have found that a device such as disclosed enables even an inexperienced person to roll pastry with great uniformity between successive batches. Furthermore when the device is made of a hard clear plastic such as "Lucite," it is very easy to sterilize and keep clean. Furthermore by the use of a multiplicity of rollers in the frame as described, the device can be used to roll the pastry in any desired direction and the rolling can be effected by one hand and a mere twist of the wrist suffices to control the direction of rolling. Furthermore with the construction as disclosed, it is very easy to control the amount and location of the pressure during the rolling operation.

Figure 4:
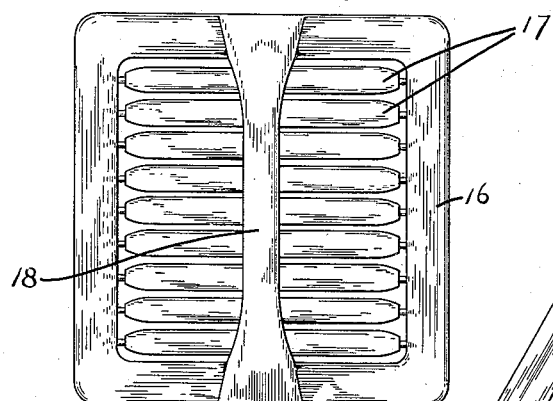
Figs. 4, 5 and 6 are top plan views of alternative forms of the device.

While the preferred embodiment of Figs. 1 to 3 shows a device wherein the frame is circular, it will be understood that the invention is not limited thereto. Thus there is shown in Fig. 4, a device wherein the frame 16 is substantially square or rectangular in shape. In this embodiment the rollers 17 are all of the same length. The material out of which the rollers 17 are formed is the same as that of the rollers 12 of Fig. 1, and the handle 18 can be substantially identical with the handle 14 of Fig. 1.

Figure 5:
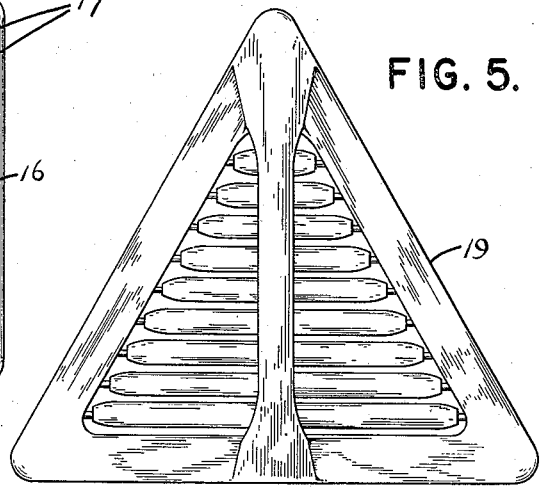

In the embodiment of Fig. 5, the frame 19 is triangular in shape. The rollers and their method of mounting in the frame are substantially the same as that described in connection with Figs. 1 to 3.

Figure 6:
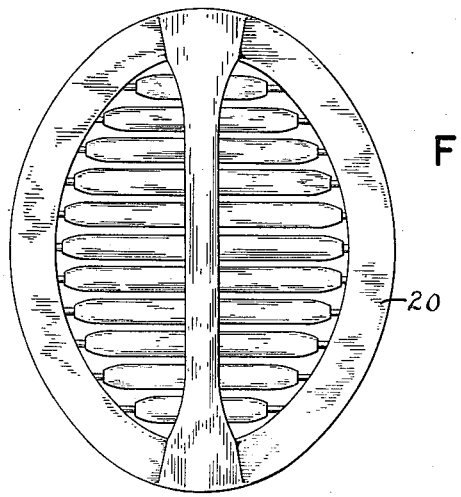

Fig. 6 shows a still further embodiment wherein the frame 20 is elliptical in shape.

While certain specific embodiments have been disclosed, it is understood that various changes and modifications may be made therein without departing from the spirit and scope of the invention. For example, while reference has been made to the rollers being of a hard clear plastic such as "Lucite," the entire device can be made of "Lucite."

What is claimed is:

1. A pastry roller device for hand rolling of pastry, comprising at least three relatively closely spaced small diameter rollers, a frame encircling said rollers and in which the rollers are rotatably supported at their respective ends, said rollers having their peripheries extending below the lower face of said frame, and a single manipulating handle attached centrally and at opposite ends to said frame and in spaced relation to said rollers to provide a substantial clearance between the handle and rollers for the purpose of easy hand gripping of the handle by one hand without touching the rollers and for exerting substantially uniform rolling pressure by said rollers on an area of the pastry commensurate with the area bounded by said frame.

2. A pastry roller device according to claim 1, in which said handle is substantially in the form of an inverted U-shape and extends transversely to said rollers.

3. A pastry roller device according to claim 1, in which the rollers are smoothly tapered in the regions adjacent the ends thereof.

4. A pastry roller device according to claim 1, in which the rollers are mounted in said frame so that their peripheries are located in a curved plane with respect to the plane of said frame.

5. A pastry roller device according to claim 1, in which said frame is circular.

6. A pastry roller device according to claim 1, in which said frame is substantially triangular with the rollers of progressively shorter length from the base to the apex of the triangular frame, and are mounted parallel to said base.

7. A pastry roller device according to claim 1, in which said frame is substantially elliptical and said rollers on each half of the frame are of progressively shorter length and are mounted parallel to the minor axis of the elliptical frame.

ALBERT BRABAZON.

REFERENCES CITED

The following references are of record in the file of this patent:

UNITED STATES PATENTS

| Number | Name | Date |
| --- | --- | --- |
| 132,736 | Peirce | Nov. 5, 1872 |
| 157,387 | Frazier | Dec. 1, 1874 |
| 241,253 | Twele | May 10, 1881 |
| 695,411 | Miller | Mar. 11, 1902 |
| 889,465 | Keller et al. | June 2, 1908 |
| 1,385,916 | Harris | July 26, 1921 |
| 1,505,851 | Bloom | Aug. 19, 1924 |

FOREIGN PATENTS

| Number | Country | Date |
| --- | --- | --- |
| 323,197 | France | July 23, 1902 |